United States Patent [19]

Arters

[11] 4,098,938

[45] Jul. 4, 1978

[54] HEAT DEFORMABLE LAMINATES AND PROCESS OF MAKING SAME

[75] Inventor: James C. Arters, Parkside, Pa.

[73] Assignee: Scott Paper Company, Philadelphia, Pa.

[21] Appl. No.: 441,797

[22] Filed: Feb. 12, 1974

Related U.S. Application Data

[63] Continuation of Ser. No. 92,869, Nov. 25, 1970, abandoned, which is a continuation of Ser. No. 860,168, Sep. 18, 1969, abandoned, which is a continuation of Ser. No. 524,509, Feb. 2, 1966, abandoned.

[51] Int. Cl.² ........................... B32B 3/12; B32B 3/26
[52] U.S. Cl. ........................... 428/160; 264/90; 264/134; 264/321; 428/172; 428/315
[58] Field of Search ........................... 161/62–67, 161/116, 125, 159, 160; 156/245, 279, 280, 285; 264/90, 134, 321; 117/33; 196/53; 206/13; 428/160, 161, 172, 315

[56] References Cited

U.S. PATENT DOCUMENTS

| | | | |
|---|---|---|---|
| 2,801,947 | 8/1957 | Winchester et al. | 264/90 |
| 3,215,584 | 11/1965 | McConnell et al. | 161/64 |
| 3,534,852 | 10/1970 | Posner | 161/159 X |
| 3,708,362 | 1/1973 | Winchcombe | 156/180 |

FOREIGN PATENT DOCUMENTS 699,450  12/1964  Canada.

*Primary Examiner*—Marion E. McCamish
*Attorney, Agent, or Firm*—Martin L. Faigus; William J. Foley

[57] ABSTRACT

A method for forming a contoured support member from a laminate of a thermoplastic sheet and a layer of resilient, flexible, stretchable, crosslinked, thermoset-type polyurethane foam including the steps of heating the laminate to a temperature at which the thermoplastic sheet is in a plastic state, and the foam layer retains its resilient, flexible, stretchable properties; deforming the laminate while the thermoplastic sheet is in its plastic state such that the thermoplastic sheet and foam layer assume the same general configuration and setting the thermoplastic sheet in its deformed configuration for retaining the foam layer in its deformed configuration.

A contoured support member including a stable, contoured, thermoplastic sheet united to a layer of a resilient, flexibly stretchable, crosslinked, thermoset-type polyurethane foam which has the same contour as the thermoplastic sheet and is retained in its contoured configuration by the thermoplastic sheet.

20 Claims, 7 Drawing Figures

HEAT DEFORMABLE LAMINATES AND PROCESS OF MAKING SAME

RELATED APPLICATIONS

This application is a continuation of application Ser. No. 92,869, filed Nov. 25, 1970, now abandoned; which in turn is a continuation of application Ser. No. 860,168, filed Sept. 18, 1969, now abandoned; which in turn is a continuation of application Ser. No. 524,509, filed Feb. 2, 1966; now abandoned.

BACKGROUND OF THE INVENTION

1. Field of the Invention

The present invention relates to composite laminates and, more particularly, to a heat deformable composite laminate and a process for making such laminates.

2. Description of the Prior Art

In the past, it has been customary to thermoform certain objects for use in displays and packaging, for example, contoured supports for pen and pencil sets in containers, from paper or plastic material generally in the form of a sheet. In the case of ordinary plastic materials, the process could often be done merely by vacuum forming.

In order to impart a more luxurious appearance and feel to the supporting material as well as to meet the needs of special applications such as preparing the panels or lining of musical instrument cases, the article contacting surface of supports is sometimes coated, such as by flocking or by the application of a separate layer of soft material such as felt. The difficulty of flocking or of applying a layer to the surface of such an article in its contoured form will be readily apparent to those skilled in the art, and manufacturers in the past have experienced a number of problems with this process.

Important features of the resulting article are uniformity of appearance and cushioning ability. It is difficult to impart a uniform appearance to the resulting article since the adherence of the fiber flock of the applied layer is often uneven and irregular when flocking is accomplished on the contoured surface. Another defect experienced with these previous methods has been the lack of sufficient cushioning afforded by the known structures employed for the above purpose. This appears to be due to an inherent limitation in the length of the fibers of the flock material as well as the inherent inability of these fibers alone to provide adequate softness or cushioning. The above problems are especially significant where this material is used as lining in carrying cases for musical instruments. Here, ability to cushion and protect the instrument becomes extremely important along with uniformity of appearance.

Ordinarily a flock surfacing is produced by a random distribution of fibrous material, of any preferred type and dimensions, over a layer of adhesive which has been applied to the particular substrate. The loading of fibrous material will determine, to a major extent, the density of the resultant surface although, in some instances, orientation of the fibrous material in a plane normal to that of the substrate through an electrical or electrostatic field or by exposure to mechanical oscillation as is so well known to the art will contribute depth to the surface stratum since only a terminal bonding of the individual fibers of the flock ensues.

But in these usual circumstances the adhesive layer must be relatively thick in order that adequate contact with the fibers will be possible and there will customarily be generated an impermeable membrane which not only unites the elements of the substrate but also reduces measurably the resiliency and natural drapability of such base. Some attempts have been made to modify the conventional adhesive compositions to compensate for these deficiencies and/or to devise improved adhesives but in most cases the desired objectives have not been achieved.

SUMMARY OF THE INVENTION

The present invention provides a heat deformable laminate which has an increased depth of cushioning effect and similarly possesses a luxurious surface appearance of a uniform texture. A unique feature of this material is the fact that by the process of the invention, it can be formed in sheet form in large quantities by a relatively continuous process and subsequently formed or shaped into the desired configuration by means of well-known thermoforming processes. For example, the material may be vacuum formed very satisfactorily and could similarly be formed by the various combination processes involving pressure forming and vacuum forming steps in conjunction with an application of heat. Due to the unique construction of the composite laminate material, upon formation into the desired configuration and removal of the heat applying means, the material will retain the desired configuration resulting in an article having uniform surface appearance and cushioning properties, which cushioning properties are of a vastly improved nature.

For purposes of this invention, the term "thermoforming" includes all types of processes involving heating of a thermoplastic sheet until it reaches a plastic state and then applying a force (usually differential air pressure) to the sheet so that it conforms to the shape of a solid mold.

The heat deformable laminate material of the invention comprises a substrate having on at least one side thereof a layer of flexible, stretchable, polyurethane foam. The substrate is bonded to the polyurethane foam and comprises a thermoplastic material capable of being formed by heat and pressure into a desired configuration integrally and simultaneously with the polyurethane foam and capable of retaining the configuration upon removal of the heat and pressure. In some embodiments, the polyurethane foam is reticulated so as to possess a series of open and interconnecting cage-like cavities. In these instances, the foam layer provides an improved cushioning ability and a uniform surface appearance having a soft appealing texture while the substrate of thermoplastic material provides a backing support for the foam material which, when thermoformed into the desired configuration, draws the polyurethane foam layer integrally along with it into the desired shape and retains the polyurethane foam layer in a fixed position upon removal of the heat and pressure.

In another embodiment, a fiber flock stratum is adhesively attached to the exposed surfaces of the polyurethane foam in a generally vertical manner to provide an increased depth of cushioning effect and an even more luxurious appearance. The fiber flock may be applied to the polyurethane foam in its unreticulated form or, to produce a softer effect, may be applied to the polyurethane foam in the reticulated form. In each of the above embodiments, the polyurethane foam exhibits inherent stretchability and is, therefore, able to expand along with the thermoplastic substrate to conform into the desired configuration.

Therefore, it is an object of the present invention to provide a new and improved heat deformable laminate material of improved physical characteristics enabling a greater utility therefor.

Another object of the present invention is to provide a heat deformable laminate having attractive physical properties such as improved cushioning ability and appearance and which can be fabricated in sheet form and subsequently formed into a desired configuration or shape by means of heat and pressure while retaining its advantageous properties.

It is a further object of the invention to provide an article of manufacture formed by a combination of heat and pressure and possessing properties of a sheet laminate material heretofore unobtainable by standard manufacturing processes.

Other objects and advantages of this invention will become apparent from the following detailed description of certain preferred embodiments thereof, read in conjunction with the accompanying drawings.

DESCRIPTION OF THE PREFERRED EMBODIMENTS OF THE INVENTION

Figure 1:
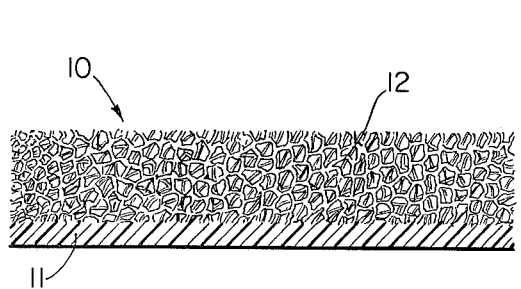
FIG. 1 is an enlarged sectional view of a portion of a heat deformable laminate constructed in accordance with the present invention.

Referring to the drawings, FIG. 1 shows a laminate indicated generally as 10 comprising a substrate 11 to which is bonded a layer 12 of cellular material. In FIG. 1, the layer 12 is comprised of reticulated polyurethane foam. The substrate 11 is a heat deformable material of a thermoplastic nature which is capable of being formed by means of heat and pressure into the desired configuration and of retaining such a configuration upon removal of the heat and pressure.

The material shown in FIG. 1 may be formed by commercially employed thermoforming processes such as vacuum forming into the desired shapes, such as contoured support members or containers and the like. The layer 12 of cellular material provides a resilient cushioning layer which is drawn into the desired shape along with the substrate 11 and which is generally used in contact with the article being supported or being contained.

Figure 2:
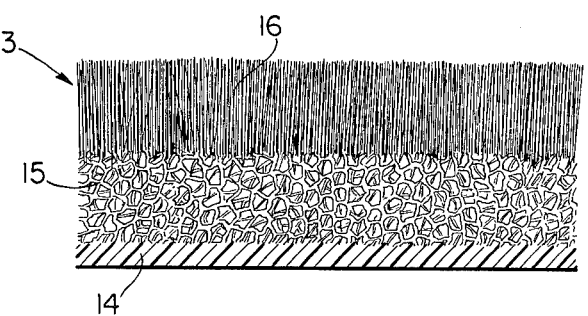
FIG. 2 is an enlarged sectional view of a portion of a modified form of a heat deformable laminate of the invention.
Figure 3:
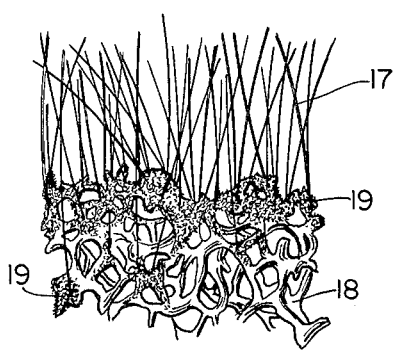
FIG. 3 is a greatly enlarged sectional view of a portion of the laminate shown in FIG. 2 and illustrates the method of flock attachment.

FIG. 2 shows a modified embodiment of the laminate 10 and is designated generally as a laminate 13. Laminate 13 includes a substrate 14 similar to substrate 11, a layer of cellular material 15 similar to layer 12, and a layer of fiber flock material 16 which is adhered to the exposed surface of the layer 15 of cellular material by means of a flexible adhesive. The flock stratum 16 is adhesively attached in a manner whereby the individual fibers are arranged in a generally vertical manner with respect to the layer 15 of cellular material. The nature of flock attachment may be more clearly seen with reference to FIG. 3 which shows a greatly enlarged view of a few fibers 17 comprising the fiber flock layer 16 in FIG. 2, attached generally vertically to the exposed portions or surfaces of a polyurethane foam layer 18 which may comprise the layer 15 in FIG. 2, by means of scattered amounts of adhesive 19. An important feature is the improved nature of the flock attachment. As can be clearly seen in FIG. 3, the fibers 17 are attached at different levels within the foam 18 and occasionally certain of the fibers 17 are attached at more than one point on the foam cellular structure. In part, by controlling the pore size or cell size of the layer 15 of cellular material, it is possible to effect attachment of the fibers 17 within a predetermined depth of the layer 15 of cellular material. The size of the individual flock fiber 17 and the manner of adhesive application will similarly effect the above control and must be taken into account.

The laminate 13 may also be formed into the desired configuration by means of commercially employed thermoforming processes, such as vacuum forming. In this manner, the layer 14 is subjected to heat and pressure and upon being drawn into the desired shape, the layer 15 is similarly pulled into a conforming shape along with the layer 16 of attached flock fibers. The resulting thermoformed article will have a stable base or substrate 14 with a resilient surface feel and a plush surface appearance. The article will exhibit a very high degree of cushioning ability and the flock stratum 16 imparts a plush appearance to the article.

Figure 4:
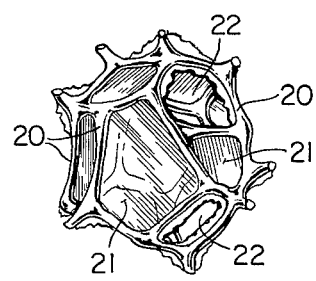
FIG. 4 is a greatly enlarged perspective view illustrating a typical cell-like cavity of an unreticulated foam layer.
Figure 5:
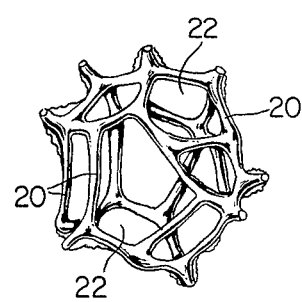
FIG. 5 is a greatly enlarged perspective view illustrating a typical cage-like cavity of a reticulated foam layer.

The nature of the foam layer 12 of the laminate 10 and the foam layer 15 of the laminate 13 is best illustrated in FIGS. 4 and 5 which are greatly enlarged views of single cells from typical cellular polyurethane foam material. Each cell is a 3-dimensional network of interconnected strands 20 which form junctions between the faces or walls of the cells of the foam body. Most so-called "open-celled" polyurethane foam, of which the cell shown in FIG. 4 is typical, possesses thin membrane-like sheets of material across at least certain or some of the cell faces as indicated by reference numeral 21 in FIG. 4. Other cell faces, as indicated by reference numeral 22 are open by virtue of the membraneous material at the face having been broken during the foaming operation.

A polyurethane resin or polymer is formed by the reaction of a diisocyanate with a polyhydroxy material. Generally, these resins are classed as, e.g., polyether or polyester polyurethanes, depending on the chemical nature of their polymeric units. There are other, less commonly used, types classified as to the nature of the polymer with which the isocyanate is reacted. A polyurethane foam is produced by generating $CO_2$, e.g., by reaction of water with an isocyanate, or other gas in the reaction mixture, e.g., by a vaporization of a volatile liquid by the heat or reaction, while converting a liquid form of the polymer to a solid form of the polymer, e.g., by cross-linking or otherwise increasing the molecular weight of the liquid polymer. The cross-linked polyurethane foams are thermoset-types of foams, and can be manufactured in either flexible or rigid form.

In the preparation of foam polymeric cellular structures, a gas or vapor is generated while the material to be formed is in the plastic state. The generation of this gas results in the formation of bubbles, approximately spherical in form. As the bubbles expand, cells are formed which have more or less definite geometric configurations. The optimum packing for spheres is an arrangement in which each sphere is surrounded by 12 other spheres; and correspondingly, it has been found that the cells formed by the expansion of gas bubbles to the point of contact, so as to produce low-density, open-cell cellular structures, generally are in the form of dodecahedrons, with pentagonal sides or faces. This is the general rule, though in any foamed mass will be found cells of varying geometry. At the intersection of the faces are heavier strands of material. Between the strands forming the cells faces or walls are very thin membrane-like films.

Although several methods of foam reticulation are known, these foams can be satisfactorily reticulated by a process described in U.S. Pat. No. 3,171,820 to Volz to form an open-celled polyester polyurethane foam of the type contemplated for use as the intermediate stratum 15 in a modified embodiment of the composite assembly. This reticulation process removes substantially all of the remaining membranes 21, shown in FIG. 4 and forming the cell faces or walls, and results in the formation of a plurality of skeletally outlined cage-like cavities. An example of a typical cell comprising the foam layer 12, and the foam layer 15, after reticulation is illustrated in greatly expanded view in FIG. 5. As is well known, in a foam of this type, there is no plane surface but rather a series of cavities or cages formed by the strands 20.

For many applications, the so-called "open-celled" polyurethane foam is preferred for use in the composite fabrications of the invention due to its resilient properties and greater load bearing ability. These characteristics are believed to be primarily due to the fact that the remaining unbroken cell faces, walls, or membranes serve to strengthen the structure and structurally uphold it under greater loads than would be the case if these remaining membranes where to be removed, as by a reticulation process.

However, in applications where load bearing characteristics of the composite material are less important than the softness, flexibility and resiliency of the structure together with its uniform appearance, it has been found preferable to employ a reticulated polymeric structure such as that illustrated by the cell in FIG. 5. Here, the conventional open-celled foam has been subjected to an aftertreatment which removes the membraneous material from substantially all of the faces of the cell, leaving only the integrally interconnected strands 20. It should be apparent that a cellular structure or foam layer 12 containing cells or cage-like cavities such as are illustrated in FIG. 5 more readily "gives" upon application of force. A more detailed description of the interconnected strand structure of FIG. 5 and a description of the method of its production are contained in U.S. Pat. No. 3,171,820 to Volz.

The layer 12 and the layer 15 of cellular material may comprise any type of flexible resilient cellular material of a light weight and which is not susceptible to damage during a particular thermoforming process to be employed. It is important that the material be stretchable and resilient so that it may be drawn into conforming shape along with the substrates 11 and 14. In other words, the cellular layers 12 and 15 are preferably flexible and, if of a rigid type, they must be susceptible of being thermoformed without structural breakdown. Polyurethane foam sheeting, of both a reticulated and unreticulated type, has been found to be excellent for this purpose. The thickness of the foam material is not critical except that it must be sufficiently thin to allow it to be drawn into a conforming shape into the particular process employed. Polyurethane foam sheeting having a thickness of from about 1/16 inch to about ⅜ inch and a pore size of from about 60 pores per inch to about 120 pores per inch has been successfully employed.

Similarly, the flock can vary in size, weight, color and composition as desired and in amounts of from about 0.5 to about 10.0 ozs. per square yard of surface as determined for the cushioning ablity and product appearance to be achieved. Nylon, acetate, acrylic fibers and other commercially extruded or spun filaments varied in length from about ½ to about 10 mm. have been found to provide suitable fiber flock for the fiber stratum 16. Rayon fibers have also been advantageously employed.

Elastic adhesives are preferably employed but other types of adhesive may be used. In addition to rubber latex adhesives, elastic adhesives such as resinous or synthetic plastics have been applied either in solution or emulsion form by spraying coating, striping, printing and comparable thicknesses after which the adhesive has been dried and cured. Many natural and synthetic rubber latices are commercially available and may be used alone or in combination. Several types of acrylonitrile interpolymers with butadiene form well known adhesives and also the polyvinyl and the polyphenol formaldehyde, aminoplast and polyurethane resins have been employed for adhesive properties. Various solvents for the materials may also be used to soften and dissolve the material thereby causing it to serve as an adhesive upon subsequent evaporation of the solvent.

As is well known, in foams and cellular materials of the type described above, there is generally no plane surface but rather a series of cavities or cages, and the surface of a sheet of such foam material is generally comprised of the members or strands of the material forming the cells or outlining the cages. Accordingly, when the foam is sprayed with adhesive, there will be material penetration of the body thereof, controllable by density of application. It follows that upon flocking the fibers can also be forced into the foam to a controlled depth to assure bonding thereof at more than one point along the fiber length thus enabling an improved attachment of the flock material to the composite. Furthermore, the flexibility of the foam stratum provides a cushioning effect which relieves much of the stress tending to rupture the adhesive bond of the flock fibers.

In order to achieve attachment of the cellular layers 12 and 15 to the substrates 11 and 14, it is possible to employ thermal fusion of the substrate such as plastic material or the cellular layer such as polyurethane foam or both to provide an adhesive or bonding means for attachment of one to the other. Various solvents for one of these materials may also be used to soften and dissolve the material thereby causing it to serve as an adhesive upon subsequent evaporation of the solvent.

Figure 6:
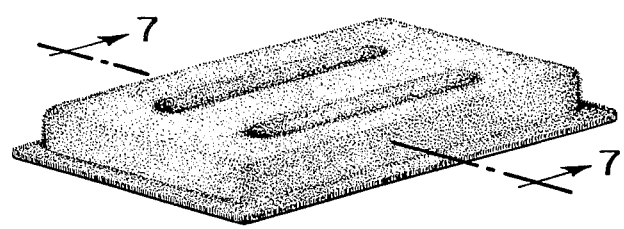
FIG. 6 is a perspective view of a typical article of manufacture constructed in accordance with the invention.

FIG. 6 is a perspective view of a typical article of manufacture constructed in accordance with the invention. The object illustrated is a contoured support member formed by a combination of heat and pressure and it serves as an insert in a container for a pen and pencil set.

Figure 7:
FIG. 7 is an enlarged sectional view taken along lines 7—7 of FIG. 6 of the article constructed of material of the embodiment illustrated in FIG. 2.

FIG. 7 is an enlarged sectional view through the article shown in FIG. 6 and illustrates in greater detail the nature of construction of the article and the manner in which it provides cushioning support as well as an alternative surface. Similar articles may be formed for use in lining cases for musical instruments which must be protected from shock and abrasion.

It can be seen that the method of the invention provides an improved method for forming such articles and materials and provides improved articles and materials of this type when compared to the present employed processes of applying layers of cushioning material directly to a contoured surface. As pointed out above, these processes must be generally performed by hand which is relatively slow and inaccurate, as well as expensive. Therefore, the invention provides a new and improved means for accomplishing the formation of a resilient support member and results in the production of improved materials for this use.

What is claimed is:

1. A method for forming a contoured support member having a contoured cushioning surface of a desired configuration for supporting an article, said method comprising the steps of:
    A. uniting a substantially impervious thermoplastic sheet to a layer of resilient, flexible, stretchable, cross-linked, thermoset-type polyurethane foam to form a laminate including a united interface between said thermoplastic sheet and said polyurethane foam layer, said thermoplastic sheet being thermoformable into a contoured configuration and being rigidified in said contoured configuration upon removal of the heat and pressure applied in the thermoforming operation;
    B. heating the laminate to a temperature at which the thermoplastic sheet is in a plastic state and said foam layer retains its resilient, flexible, stretchable properties;
    C. applying a force to the laminate while the thermoplastic sheet is in a plastic state to deform the laminate into engagement with a mold surface having the desired configuration of the cushioning surface, said thermoplastic sheet and polyurethane foam layer assuming the same general configuration as said mold surface, said polyurethane foam layer retaining its resilient, flexible, stretchable properties and having an exposed surface opposite its united interface constituting the contoured cushioning surface; and
    D. removing the heat and force applied to the laminate, said thermoplastic sheet being rigidified in its contoured configuration for retaining said foam layer in its contoured configuration, said foam layer retaining its resilient, flexible, stretchable properties throughout the entire process for forming the contoured support member.

2. The method according to claim 1, wherein the deforming force deforms the laminate into conformity with a mold surface including at least one cavity.

3. The method according to claim 1, wherein said force is applied to said laminate by applying a vacuum through the mold surface to deform the thermoplastic sheet into engagement with said mold surface.

4. The method according to claim 1, wherein said force applied to the laminate deforms the thermoplastic sheet into engagement with said mold surface.

5. The method according to claim 4, including, prior to said thermoforming step, applying an adhesive to the exposed surface of said form layer and applying generally vertically a fiber flock to said exposed surface whereby said adhesive bonds said fiber flock to the foam layer to form a composite sheet having a flocked surface.

6. The method according to claim 5, wherein said force is applied to said laminate by applying a vacuum through the mold surface to deform the thermoplastic sheet into engagement with said mold surface without flattening the fiber flock.

7. A method for forming a contoured support member from a laminate comprising a substantially impervious thermoplastic sheet united to a layer of resilient, flexible, stretchable, cross-linked thermoset-type polyurethane foam, said thermoplastic sheet being thermoformable into a contoured configuration and being rigidified in said contoured configuration upon removal of the heat and pressure applied in the thermoforming operation, said method comprising the steps of:
    A. heating the laminate to a temperature at which the thermoplastic sheet is in a plastic state and said foam layer retains its resilient, flexible, stretchable properties;
    B. applying a force to the laminate while the thermoplastic sheet is in a plastic state to deform the laminate into engagement with a mold surface having the desired configuration of the cushioning surface, said thermoplastic sheet and polyurethane foam layer assuming the same general configuration as said mold surface, said polyurethane foam layer retaining its resilient, flexible, stretchable properties and having an exposed surface opposite its united surface constituting the contoured cushioning surface; and
    C. removing the heat and force applied to the laminate, said thermoplastic sheet being rigidified in its contoured configuration for retaining said foam layer in its contoured configuration, said foam layer retaining its resilient, flexible, stretchable properties throughout the entire process of forming the contoured support member.

8. The method according to claim 7, wherein the deforming force deforms the laminate into conformity with a mold surface including at least one cavity.

9. The method according to claim 7, wherein said force is applied to said laminate by applying a vacuum through the mold surface to deform the thermoplastic sheet into engagement with said mold surface.

10. The method according to claim 7, wherein said force applied to the laminate deforms the thermoplastic sheet into engagement with said mold surface.

11. The method according to claim 10, including, prior to said thermoforming step, applying an adhesive to the exposed surface of said foam layer and applying generally vertically a fiber flock to said exposed surface whereby said adhesive bonds said fiber flock to the foam layer to form a composite sheet having a flocked surface.

12. A contoured support member having a contoured cushioning supporting surface of a desired configuration for supporting an article, said support member comprising:
    (a) a stable, contoured, thermoplastic sheet having an inner surface contour substantially the same as the contour of said supporting surface;

(b) a layer of resilient, flecibly stretchable, crosslinked thermoset-type polyurethane foam having a surface secured to said inner surface of said thermoplastic sheet, said polyurethane foam layer having generally the contour of said inner surface of the thermoplastic sheet whereby the exposed surface of the polyurethane foam layer opposite from said secured surface has the same general configuration as the inner surface of the thermoplastic sheet and constitutes the supporting surface of the support member; and (c) said stable thermoplastic sheet retaining said polyurethane foam layer in its contoured configuration.

13. The contoured support member according to claim 12, wherein said contoured supporting surface includes at least one cavity.

14. The contoured support member according to claim 12, wherein said contoured supporting surface includes a cavity configuration generally conforming to the shape of an article to be supported therein.

15. The contoured support member according to claim 12, including a fiber flock adhesively secured to the supporting surface of the polyurethane foam layer.

16. The contoured support member according to claim 15, wherein said fiber flock is comprised of fibers arranged generally vertically with respect to the layer of foam.

17. The contoured support member according to claim 15, wherein said polyurethane foam layer is reticulated and possesses at its surface a series of interconnected strands defining cage-like cavities, and the fibers of said fiber flock being adhesively secured to the foam layer within a preselected depth of the cavities for adhesively securing some of said fibers to said reticulated foam at more than one point to thereby provide improved attachment and an increased depth of cushioning effect.

18. The contoured support member according to claim 12, wherein said polyurethane foam layer has a thickness of from about 1/16 inch to about ⅜ inch.

19. The contoured support member according to claim 18, wherein said foam layer is an open-celled polyurethane foam.

20. The contoured support member according to claim 18, wherein said foam layer is a reticulated polyurethane foam.

* * * * *